United States Patent
Celso

(10) Patent No.: US 6,191,537 B1
(45) Date of Patent: Feb. 20, 2001

(54) SOLID STATE RESONANCE IGNITER FOR CONTROL OF THE NUMBER OF HIGH VOLTAGE PULSES FOR HOT RESTRIKE OF DISCHARGE LAMPS

(75) Inventor: Francesco Celso, Borgone Susa (IT)

(73) Assignee: Quality Light Electronics S.A.S., Turin (IT)

( * ) Notice: Under 35 U.S.C. 154(b), the term of this patent shall be extended for 0 days.

(21) Appl. No.: 09/396,208

(22) Filed: Sep. 15, 1999

(30) Foreign Application Priority Data

Sep. 15, 1998 (EP) .................................................. 98830538

(51) Int. Cl.[7] .................................................. H05B 37/02
(52) U.S. Cl. .......................... 315/219; 315/224; 315/276
(58) Field of Search .................................. 315/307, 224, 315/DIG. 7, 209 R, 219, 276

(56) References Cited

U.S. PATENT DOCUMENTS

| | | | |
|---|---|---|---|
| 4,060,751 | 11/1977 | Anderson | 315/209 R |
| 4,818,917 | 4/1989 | Vest | 315/171 |
| 5,004,960 | 4/1991 | Cockram et al. | |
| 5,039,921 * | 8/1991 | Kakitani | 315/307 |
| 5,233,273 * | 8/1993 | Waki et al. | 315/224 |
| 5,426,350 * | 6/1995 | Lai | 315/244 |

FOREIGN PATENT DOCUMENTS

| | | |
|---|---|---|
| 195 30746 A1 | 2/1997 | (DE) . |
| 0 752 806 | 1/1997 | (EP) . |

* cited by examiner

Primary Examiner—David Vu
(74) Attorney, Agent, or Firm—Sughrue, Mion, Zinn, Macpeak & Seas, PLLC

(57) ABSTRACT

A solid state igniter device for hot restrike of discharge lamps with an associated supply circuit. The ignitor device comprises a primary circuit with at least one solid state switch element controlled to switch to induce in the primary circuit a controlled oscillation phenomenon at a frequency greater than a megahertz and a secondary circuit including a resonant circuit with a high quality factor Q (at least 100), capable of resonating and producing a pulse signal for striking the discharge of the lamp, controlled through the controlled oscillation phenomenon produced in the primary circuit. A control unit acting on the switch element controls the oscillation phenomenon in a pulse mode as a function of the characteristics of the lamp and the power supply, wherein the control unit induces the controlled oscillation phenomenon for a predetermined time duration a programmable number of times in a predetermined time interval.

14 Claims, 4 Drawing Sheets

SOLID STATE RESONANCE IGNITER FOR CONTROL OF THE NUMBER OF HIGH VOLTAGE PULSES FOR HOT RESTRIKE OF DISCHARGE LAMPS

FIELD OF THE INVENTION

The present invention relates to an igniter for discharge lamps (or arc lamps, the two terms being here considered equivalent to one another) with an associated supply circuit able to provide a supply signal to the lamp.

BACKGROUND OF THE INVENTION

Discharge lamps are used in many fields of application where characteristics of high luminance and quality of the radiation are required, for example in cinematographic and television filming, in the photographic field, in scientific and medical applications, and as sources of light in a large range of projectors. Recent developments have introduced such lamps in the automotive market.

During operation such lamps are supplied by a voltage of the order of several tens or hundreds of volts (supply voltage) which can maintain an electric arc between the electrodes of the lamp. Depending on the model of the lamp the supply voltage required is dc, ac (in the majority of actual cases at mains frequency) or a square wave.

Upon starting it is necessary to strike the arc between the electrodes of the lamp in such a way that it can then be maintained over time by the supply voltage. In the cold state discharge lamps are perfect insulators since the gas filling the bulb has an insulating effect between the two electrodes, and the application of only the supply voltage (from 15 to 440 volts depending on the type of lamp) does not produce sufficient energy to strike the arc. For starting the lamp, therefore, it is necessary to ionise and render conductive the gas filling the bulb through a voltaic arc caused by a high voltage discharge.

Discharge lamps are provided with igniter devices (also simply called "igniters") able to provide a high ignition voltage, of the order of kilovolts, to the electrodes. Although only a few kilovolts are needed for starting when the lamps are cold, to obtain ignition in the hot state after the lamp has been extinguished and the dielectric resistance to discharge is greater, voltages up to 10 times greater (10–70 kV) are necessary.

To allow lamps to be started in all temperature conditions it is known in the art to use "superimposition" igniters, the mode of operation of which consists in superimposing, during the ignition phase, the discharge ignition voltage over the supply voltage provided for normal operation. The ignition voltage required is provided in the form of a sequence of pulses obtained as a consequence of the electrical discharge across the terminals of a spark gap, amplified by a transformer coupling the igniter with a supply circuit of the lamp. The ignition voltage depends in such cases on the frequency, and voltages of the order of several tens of kilovolts such as those necessary for igniting the lamp in any temperature state are in practice obtained by means of igniters which generate pulses at frequencies in the megahertz range. A typical pulse generated across the terminals of the lamp by a superimposition igniter with a spark gap operating in the megahertz range is represented in attached FIG. 5, in which the damped oscillations are reproduced in the drawing at a frequency not representative of the frequency of oscillation in real cases solely for the purpose of clarity of illustration.

Although by now established and reliable, the ignition technique using igniters provided with spark gaps has intrinsic disadvantages, above all from the point of view of the control of the operation. The discharge through the spark gap, constitutes an electrical phenomenon which is generally difficult to control, the parameters of which can vary as a function, for example, of the deterioration of the spark gap itself which must periodically be replaced or adjusted. The discharge to the electrodes is a disruptive discharge having many harmonic components, and is therefore a source of electromagnetic and acoustic noise. Since lamps of the type described are commonly used in environments where electronic circuits sensitive to electromagnetic noise are present, it is important to have available igniter devices which disturb the operation of nearby circuits as little as possible. In a spark gap the electrical discharge across the terminals of the electrodes is, moreover, a phenomenon the instant of activation of which is difficult to control with precision, and the duration of which is severely limited; since the spark gap consumes a considerable amount of energy the current between the electrodes falls rapidly and the electric arc is interrupted after a short time (the duration $T_d$ shown is, in practical cases, about 5 $\mu$s).

In U.S. Pat. No. 4,060,751 entitled "Dual Mode Solid State Inverter Circuit for Starting and Ballasting Gas Discharge Lamps" published Nov. 29, 1997, there is described an inverter circuit comprising a pair of solid state switches operating in phase opposition used for the production of an igniter/power supply for discharge lamps. A resonant circuit is associated with the lamp and controlled by the inverter circuit at the resonant frequency so as to generate peak voltages across the terminals of the discharge lamp and facilitate ignition thereof. The quality factor Q of the resonant circuit is however very low (a Q greater than 2 or 3 is considered to be sufficient) and the ignition voltage which is generated across the electrodes of the lamp cannot reach values of tens of kilovolts. In the particular circuit arrangement, after starting of the lamp the igniter acts as a supply circuit thereof and limits the supply current thereto. However this arrangement does not provide the necessary versatility and, in particular, the igniter described is not easily controllable to manage the number and duration of pulses as a function of the type of lamp to which it is coupled.

SUMMARY OR THE INVENTION

The object of the present invention is to overcome the above-mentioned disadvantages and provide an igniter device in which it is possible to control the number and duration of high voltage pulses for triggering the lamp, and in particular for achieving ignition with the smallest possible voltage while maintaining this voltage across the electrodes of the lamp for a longer time than has been possible with prior art devices.

Pulse operation in power electronics made it possible to implement a solid state, high frequency high voltage igniter for hot restrike of discharge lamps.

The arrangement according to the invention further proposes to generate a high voltage signal for triggering the lamp having lower harmonic components in such a way as to limit electromagnetic noise.

A further object of the invention is to provide an igniter device which makes available an electronic command for optimising ignition of different types of discharge lamps so as to make such igniters adaptable to the type of lamp with which they are associated.

To this end the subject of the present invention is a igniter device having the characteristics set out specifically in the subsequent claims.

BRIEF DESCRIPTION OF THE DRAWINGS

Further advantages and characteristics of the present invention will become apparent from the following description, given purely by way of non-limitative example, with reference to the attached drawings, in which.

DETAILED DESCRIPTION OF THE PRESENT INVENTION

Figure 1A:
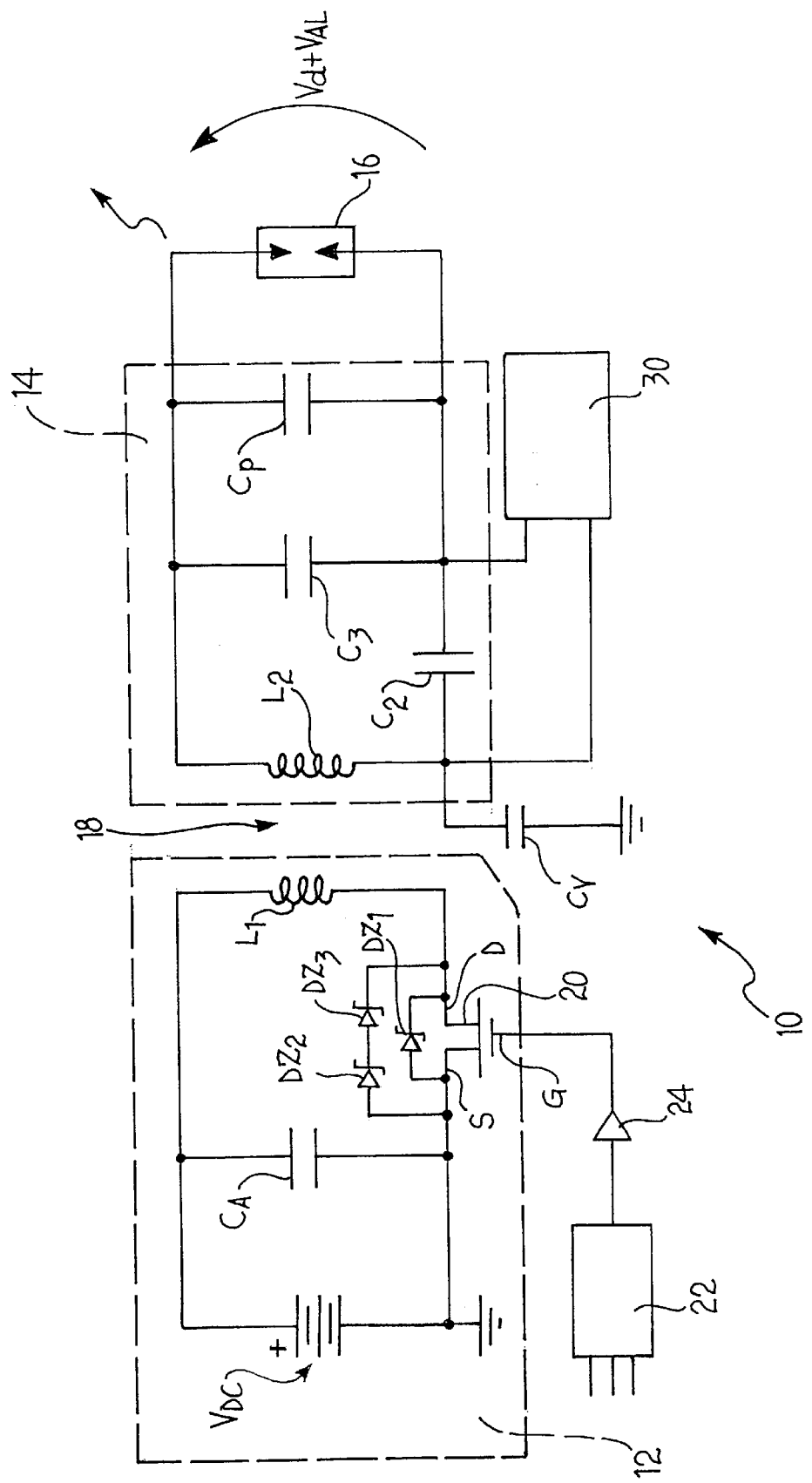
FIGS. 1a and 1b illustrate a simplified circuit diagram of an igniter device according to the invention in association with a discharge lamp, respectively including one or two switches in the primary circuit.

An igniter device according to the invention is indicated primary circuit 12 and a secondary circuit 14, this latter being directly coupled to a discharge lamp 16.

The primary circuit 12 has a dc voltage source $V_{DC}$ which may be directed from the main AC voltage or may be taken directly from a battery, and a starting capacitor $C_A$ in parallel with this source. The capacitor $C_A$ is also disposed in parallel with the primary winding $L_1$ of a transformer 18 via an electronic switch 20. The switch 20 is a FET transistor, and in the currently preferred embodiment is formed as a MOS-FET power transistor. The source electrode S of the transistor 20 is connected to a reference voltage such as the ground voltage, while the drain electrode D is directly coupled to a terminal of the primary winding $L_1$ of the transformer. In parallel with the transistor 20 it is moreover possible to arrange a series of zener diodes $DZ_1$, $DZ_2$, $DZ_3$ for protection against over voltages which can be generated between the drain and source electrodes. The transistor 20 is controlled at its gate input G by a control unit 22 such as a microcontroller or microprocessor, or more simply a dedicated logic circuit (such as, for example, a wired logic circuit), via a suitable control stage 24.

The secondary circuit 14 is coupled to the primary circuit via the secondary winding $L_2$ of the transformer 18. A decoupling capacitor $C_2$ is disposed in series between the secondary winding $L_2$ and the lamp 16 and is employed to separate the ignition voltage (the predominant harmonic component of which is constituted by frequencies of the order of megahertz) from a supply circuit 30 operating at a few tens or hundreds of hertz or at dc, so that this latter is not subject to the ignition discharges with possible risks of damage. In practice, the capacitor $C_2$ behaves as a short circuit with respect to the ignition pulse, and the secondary winding $L_2$ can be seen as connected in parallel to the lamp 16. In parallel to this winding there is further disposed a capacitor $C_3$ as to constitute a resonant circuit. The presence of the capacitor $C_3$ makes the effects of the parasitic capacitance normally present in the circuit, and indicated $C_p$ in the circuit diagram illustrated, negligible in the variation of the resonant frequency of the secondary circuit 14. If the inductance of the secondary winding $L_2$ is of a suitable value (for example 250 $\mu$H to 500 $\mu$H at about 3 MHz, depending on the self-capacitance of the winding) the system can operate without capacitor $C_3$, and the resonance will occur by means of the load parasitic capacitance $C_p$ (about 1 pF–5 pF).

A further capacitor $C_y$ is present to connect a terminal (cold pole) of the secondary winding $L_2$ to the reference voltage (the ground voltage) permitting the localization of the high voltage solely at the opposite terminal (hot pole) and to substantially protect the power supply and the primary circuit 12 from high frequency noise.

Finally, the igniter is provided with an operating device (not shown) associated with the input to the control unit 22 and through which it can be activated. This device can advantageously be formed utilizing remote-controlled receiver apparatus to allow remote activation of the igniter.

The operation of the igniter device according the invention is based on the idea of producing and controlling the evolution of an oscillation phenomenon in the primary circuit 12 of the igniter as a function of the characteristics of the secondary circuit and the lamp to which it is coupled.

The secondary circuit 14 is formed as a resonant LC circuit having a high quality factor Q, for example with Q equal to at least 100 and preferably equal to about 200–300. The high Q of the secondary circuit is achieved by forming a secondary winding $L_2$ with a high quality factor. This winding is formed as a coil wound on a dielectric core, for example simply in air. In the currently preferred embodiment this winding is formed by a coil wound on the ceramic support of the capacitor $C_3$ so as to limit the dimensions of the LC circuit and further improve its Q by limiting the length of the high frequency connections. The capacitor $C_3$ itself is chosen from among capacitors which have temperature and frequency stability characteristics in such a way as to limit the drift of the resonant frequency of the secondary circuit with variations in the operating conditions of the igniter.

The control unit 22 controls the opening and closing commutations of the switch 20 in such a way as to control the application of the voltage present across the terminals of the starting capacitor $C_A$ to the terminals of the primary winding $L_1$ of the transformer 18.

The voltage present across the terminals of the capacitor $C_A$ is generally obtained by rectifying the main voltage and is for this reason of the order of hundreds of volts.

Figure 1B:
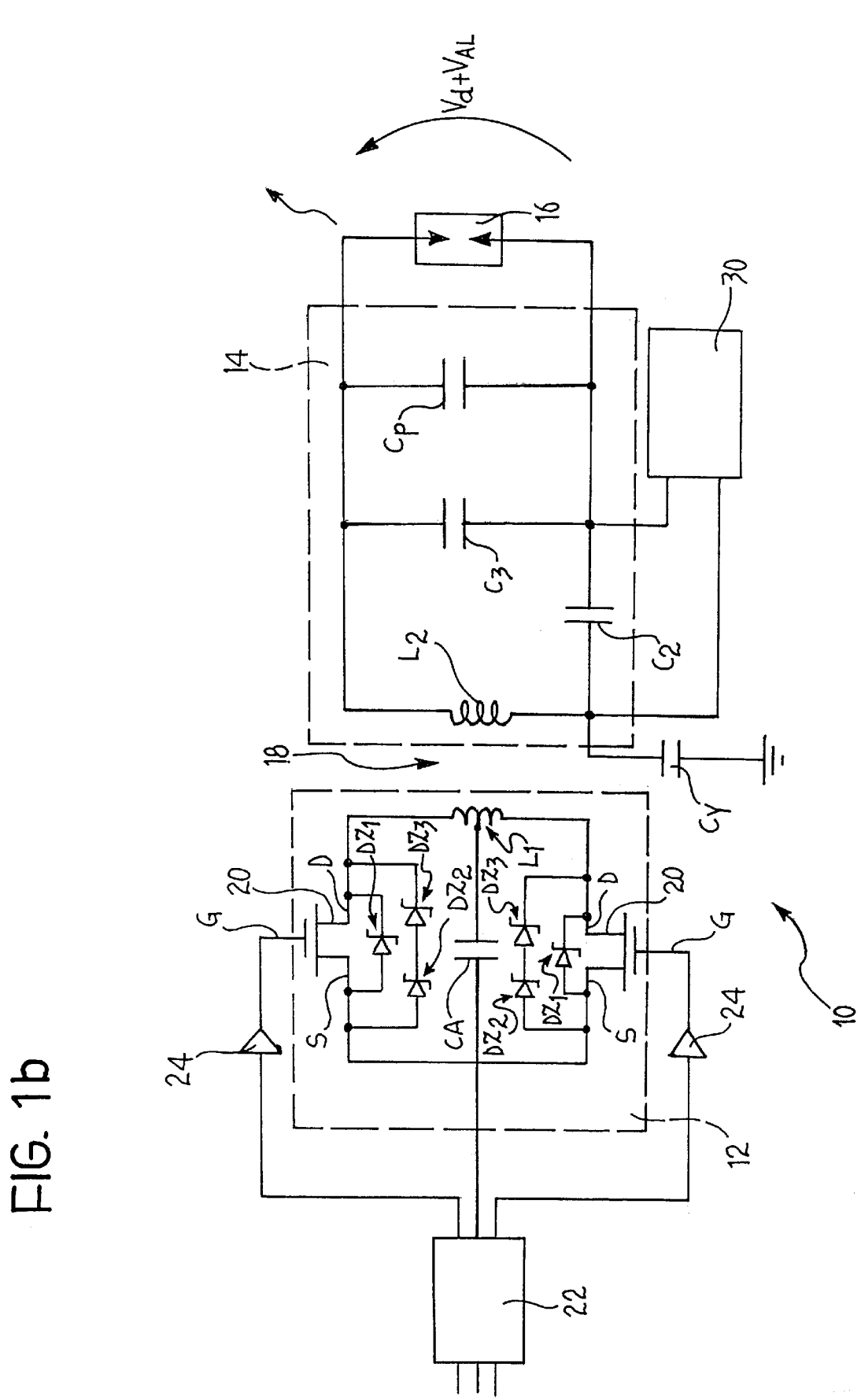

An alternative embodiment is possible in which the oscillation phenomenon across the terminals of the primary of the transformer 18 is obtained by utilizing two switches connected in a phase opposition arrangement as illustrated in FIG. 1b. The capacitor $C_A$ is interposed between a common connection line of the switches 20 and an intermediate terminal of the primary winding $L_1$ which is therefore itself subdivided into two generally symmetrical parts each of which is selectively connected to the voltage present across the terminals of the capacitor $C_A$.

The commutations (pulses) of the switch 20 are controlled in a very precise manner by the control unit 22 in such a way as to induce in the primary circuit 12 an oscillation phenomenon at a frequency of the order of megahertz (typically from 2 to 4 MHz) corresponding to the resonant frequency of the secondary circuit 14. The frequency of oscillation in the primary circuit can be preselected from outside arbitrarily, but more advantageously is determined by the same control unit 22 equipped to detect the resonant frequency of the secondary circuit 14 according to known criteria.

Figure 2:
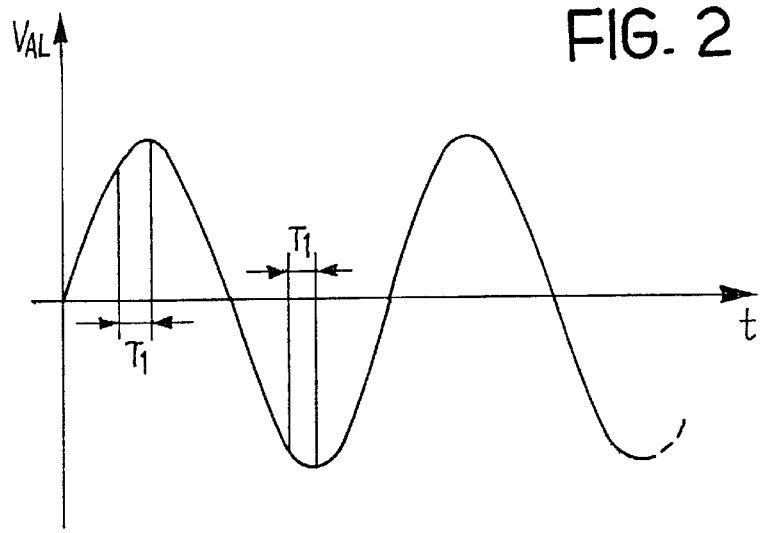
FIG. 2 is a diagram which illustrates the time variation of the supply voltage of a discharge lamp at mains frequency in which the preferred time intervals for operation of the igniter device can be seen.
Figure 5:
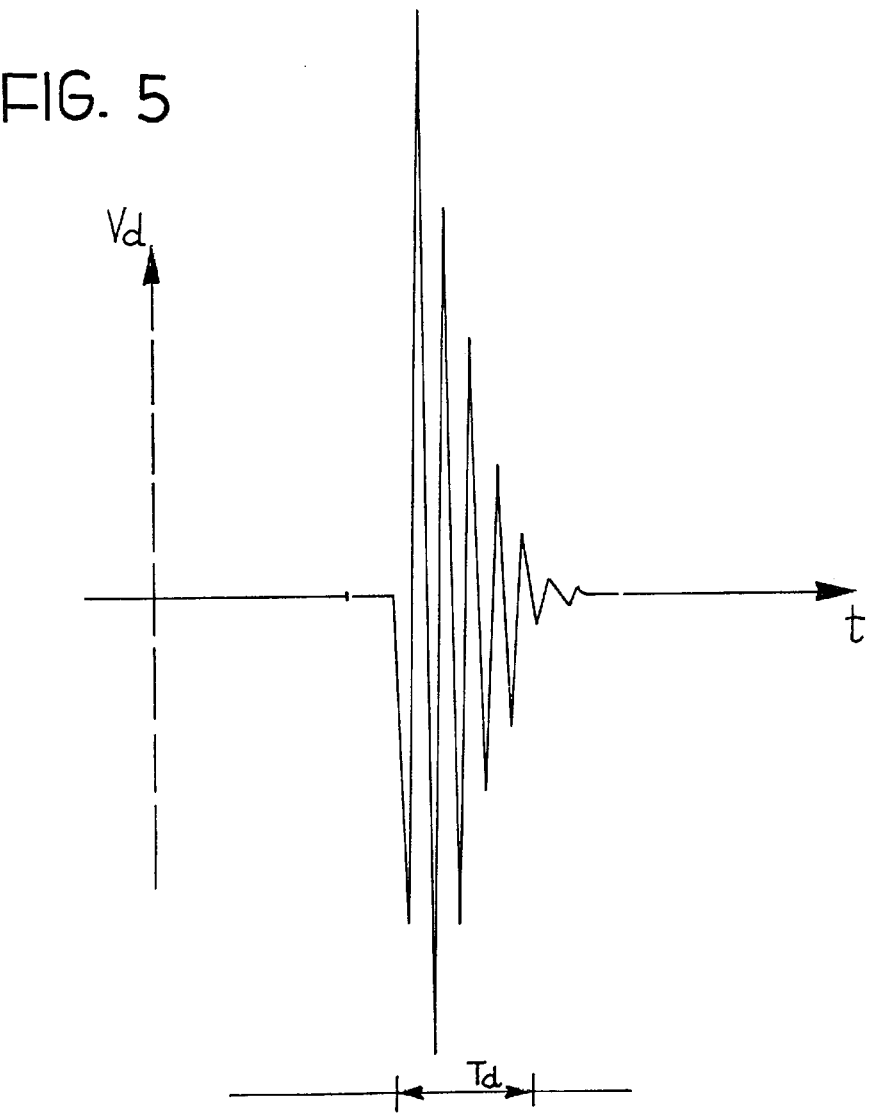
FIG. 5 illustrate the variation of the ignition voltage generated across the electrodes of the lamp by a prior art igniter device with a spark gap.

With reference to the diagram of FIGS. 2, 3 and 4 the generation of the ignition voltage across the electrodes of the lamp 16 will be better described hereinafter.

The igniter device is activated when the no-load voltage provided by the supply circuit 30 to the electrodes of the lamp reaches a predetermined threshold value. Ignition voltage pulses can be generated at different time intervals depending on the power supply feeding the lamp. If the lamp operates on AC, the control unit 22 controls activation of the igniter for a time interval $T_1$ coinciding with precisely determined phase angles of the supply voltage $V_{AL}$ (generally 60°–90° and/or 240°–270°, that is to say when the supply voltage is reaching its peaks). In this time interval $T_1$ an oscillation phenomenon is induced a programmable number of times, this number being determinable as a function of the characteristics of the lamp with which the igniter is associated and typically lying between several units and several tens. The oscillation phenomenon is induced each time for a predetermined duration, of the order of several tens of microseconds. It has been experimentally determined that the greater is the duration (up to times of 30–40 $\mu s$ and beyond) the smaller is the peak voltage required to strike the discharge between the electrodes of the lamp.

The control unit 22 can be programmed in dependence on physical lamp operating parameters (including capacitive load and nominal ignition voltage) in such a way as to repeat the ignition attempts for a predetermined minimum time (typically correlated to the nominal ignition voltage) as a function of different possible cooling stages of the lamp.

Figure 3:
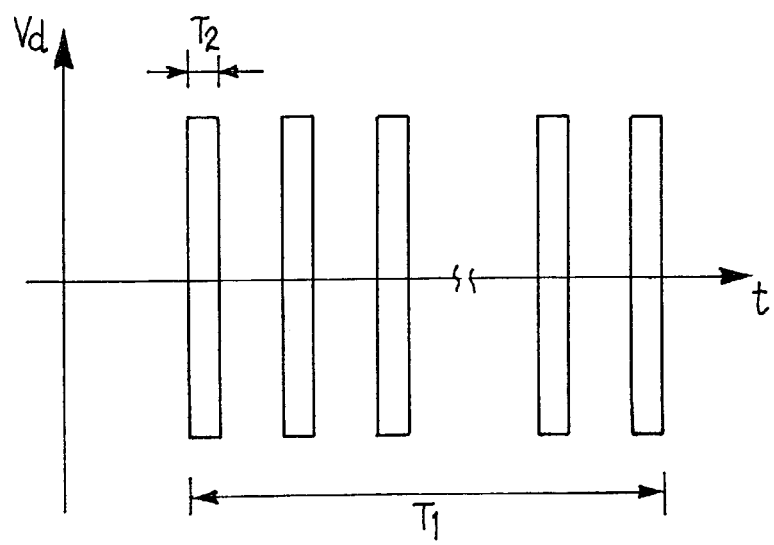
FIG. 3 is a diagram which illustrates the sequence of ignition voltage pulses generated by the igniter device across the electrodes of the lamp during each operation time interval.
Figure 4:
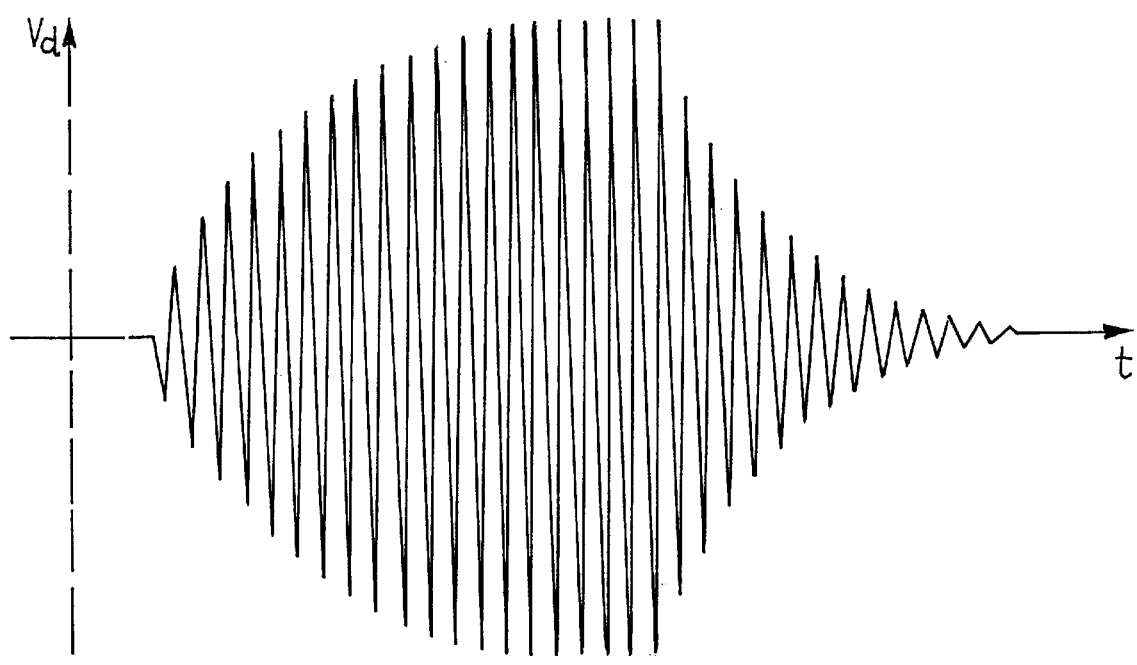
FIG. 4 shows the variation of the ignition voltage in correspondence with each ignition pulse generated by an igniter device according to the invention.

In FIG. 3 there is shown an envelope curve of the ignition voltage $V_d$ which is set up across the electrodes of the lamp following amplification produced by the resonant secondary circuit 14 of the oscillations induced in the primary circuit 12. The envelope curve of the ignition voltage $V_d$ is represented as a sequence or packet of "pulses" on a time scale corresponding to a time interval $T_1$, the number of pulses being determined as a function of the characteristics of the lamp and the power supply. Each "pulse" is the envelope of a carrier wave the variation of which is qualitatively illustrated in FIG. 4 (in this figure the frequency of the carrier wave illustrated with reference to the base time plotted along the abscissa is not representative of the frequency really used, but rather very much less than this, solely for the purpose of making the drawing comprehensible).

The voltage signal $V_d$ induced across the electrodes of the lamp 16, due to the excellent characteristics of stability, and to the low losses of the secondary resonant circuit 14, is maintained by controlling the switch (or switches) 20 to switch for the desired time period $T_2$. The train of pulses activated for a time interval $T_1$ (or even a single pulse per time interval $T_1$) makes it possible to maintain and widen the conductive channel which is created between the electrodes.

The possibility of controlling at will the duration of the oscillation phenomenon makes it possible to increase the time interval for which a high ignition voltage is set up across the electrodes of the lamp and facilitates ionisation of the dielectric between the electrodes. It thus becomes possible to ignite the lamp with ignition voltages equal to about 40–70% of the ignition voltages required with igniters with a spark gap.

A prior art igniter with a spark gap is not able to achieve such performance because the oscillation phenomenon induced by the discharge of the spark gap is not controllable in duration.

The arrangement according to the invention makes it possible on the contrary to have available a programmable electronic control for optimising the starting of different types of discharge lamps present on the market making a few basic types of igniter adaptable to very many models of lamp, different from one another in light emission characteristics and application.

What is claimed is:

1. An igniter device for hot restrike of a discharge lamp having an associated supply circuit for providing a supply signal to the lamp, the igniter device comprising:
   a primary circuit comprising oscillator means for inducing in the primary circuit a controlled oscillation phenomenon at a frequency greater than one megahertz, said oscillator means comprising at least one switch element;
   a secondary circuit for resonating said controlled oscillation phenomenon and generating an ignition pulse signal which is provided to said lamp;
   electromagnetic coupling means interposed between said primary circuit and said secondary circuit, for transferring said controlled oscillation phenomenon to said secondary circuit inducing resonance in said controlled oscillation phenomenon to strike the discharge in the lamp; and
   control means coupled to said oscillator means for selectively controlling said oscillation phenomenon in a pulse mode as a function of the characteristics of the lamp and a power supply for the lamp, said control means controllably inducing said controlled oscillation phenomenon for a predetermined time duration a programmable number of times in a predetermined time interval.

2. An igniter device according to claim 1, wherein said secondary circuit includes at least one inductive component and a capacitive component connected together to form a resonant circuit having a high quality factor Q.

3. An igniter device according to claim 1, wherein sad predetermined time duration is of several tens of microseconds.

4. An igniter device according to claim 2, wherein said secondary circuit has a quality factor Q at least equal to 100.

5. An igniter device according to claim 1, wherein said control means are arranged to activate said controlled oscillation phenomenon by inducing the resonance in said secondary circuit in correspondence with a predetermined phase angle of said supply signal.

6. An igniter device according to claim 1, wherein said control means are arranged to adjust the frequency of oscillation in said oscillator means as a function of the resonant frequency of said secondary circuit.

7. An igniter device according to claim 2, in which said coupling means comprise a primary winding of a transformer which is coupled to a respective secondary winding, said secondary winding being formed as a coil wound on a dielectric core.

8. An igniter device according to claim 1, wherein said control means are arranged to activate said igniter device when said supply signal has reached a predetermined threshold value.

9. An igniter device according to claim 1, wherein said control means induce said oscillation phenomenon for a predetermined minimum time as a function of physical parameters or a particular cooling stage of said lamp.

10. An igniter device according to claim 1, wherein said control means comprises a dedicated logic circuit.

11. An igniter device according to claim 1, wherein said control means comprises a microprocessor control unit.

12. An igniter device according to claim 1, wherein said at least one switch element comprises a FET transistor.

13. An igniter device according to claim 1, wherein said oscillator means comprises first and second switch elements connected in a phase opposition configuration.

14. An igniter device according to any of claims 1–13, further comprising operating means associated with said control means, said operating means comprising a remote-controlled receiver device for activating said igniter device from a distance.

* * * * *